United States Patent
Shannon et al.

(10) Patent No.: US 11,792,243 B2
(45) Date of Patent: Oct. 17, 2023

(54) SYSTEM AND METHOD FOR CONDUCTING MULTI-SESSION USER INTERACTIONS

(71) Applicant: Bank of America Corporation, Charlotte, NC (US)

(72) Inventors: Stephen Thomas Shannon, Charlotte, NC (US); Katherine Kei-Zen Dintenfass, Lincoln, RI (US); Adithya Gadwale, Falls Church, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/578,628

(22) Filed: Jan. 19, 2022

(65) Prior Publication Data

US 2023/0231894 A1    Jul. 20, 2023

(51) Int. Cl.
  *H04L 65/403* (2022.01)
  *H04L 65/1089* (2022.01)
  *G06F 21/31* (2013.01)
  *G06F 40/40* (2020.01)
  *H04L 65/1069* (2022.01)

(52) U.S. Cl.
  CPC .......... *H04L 65/403* (2013.01); *G06F 21/31* (2013.01); *G06F 40/40* (2020.01); *H04L 65/1069* (2013.01); *H04L 65/1089* (2013.01)

(58) Field of Classification Search
  None
  See application file for complete search history.

(56) References Cited

U.S. PATENT DOCUMENTS

| | | | |
|---|---|---|---|
| 8,990,068 B2 | 3/2015 | Orsini et al. |
| 9,153,166 B2 | 10/2015 | Lombardi et al. |
| 9,223,849 B1 | 12/2015 | Bilinski et al. |
| 9,298,589 B2 | 3/2016 | Gautallin et al. |
| 9,338,493 B2 | 5/2016 | Van Os et al. |
| 9,477,826 B2 | 10/2016 | Turgeman et al. |
| 9,529,987 B2 | 12/2016 | Deutschmann et al. |
| 9,753,922 B2 | 9/2017 | Husler et al. |
| 9,767,651 B2 | 9/2017 | Fine et al. |
| 9,818,061 B1 | 11/2017 | Shams et al. |
| 9,880,715 B2 | 1/2018 | Behar et al. |
| 9,898,864 B2 | 2/2018 | Shapira et al. |
| 9,904,442 B2 | 2/2018 | Hamilton, Ii et al. |
| 10,055,560 B2 | 8/2018 | Turgeman |

(Continued)

*Primary Examiner* — Scott B Christensen (57) ABSTRACT

A system for conducting multi-session user interactions accesses a first interaction session between the user and a first entity, where the first interaction session is via a first communication channel. The system determines first context information associated with the first interaction session, where the first context information associated with the first interaction session comprises a summary associated with the first interaction session. The system generates a token identifier (ID) uniquely identifying the user and the first context information. The system associates the token ID to the user interaction information. The system accesses a second interaction session between the user and a second entity, wherein the second interaction session is via a second communication channel. The system authenticates the user based at least in part upon the token ID. The system communicates the first context information associated with the first interaction session to the second entity.

20 Claims, 3 Drawing Sheets

(56) References Cited

U.S. PATENT DOCUMENTS

| | | |
|---|---|---|
| 10,073,521 B2 | 9/2018 | Kim et al. |
| 10,275,959 B2 | 4/2019 | Ricci |
| 10,276,160 B2 | 4/2019 | Andreas et al. |
| 10,412,210 B2 | 9/2019 | Bjontegard |
| 10,437,347 B2 | 10/2019 | Holz et al. |
| 10,437,381 B2 | 10/2019 | Wright |
| 10,444,963 B2 | 10/2019 | Bereza et al. |
| 10,488,915 B2 | 11/2019 | Kamhi et al. |
| 10,511,833 B2 | 12/2019 | Valdivia et al. |
| 10,521,093 B1 | 12/2019 | Laukkanen et al. |
| 10,555,020 B2 | 2/2020 | Gordon et al. |
| 10,564,731 B2 | 2/2020 | Bell et al. |
| 10,594,786 B1 | 3/2020 | Perez, Iii et al. |
| 10,614,171 B2 | 4/2020 | Orsini et al. |
| 10,656,724 B2 | 5/2020 | Kramer et al. |
| 10,657,333 B2 | 5/2020 | Leydon et al. |
| 10,664,222 B2 | 5/2020 | Miller et al. |
| 10,732,803 B2 | 8/2020 | Duffield et al. |
| 10,771,513 B2 | 9/2020 | Zeng et al. |
| 10,782,043 B2 | 9/2020 | Nemcek et al. |
| 10,817,130 B2 | 10/2020 | Holz |
| 10,839,687 B2 | 11/2020 | Keller et al. |
| 10,914,606 B2 | 2/2021 | Pahwa et al. |
| 10,958,599 B1 | 3/2021 | Penov et al. |
| 11,036,304 B2 | 6/2021 | Holz |
| 11,087,032 B2 | 8/2021 | Baran |
| 11,100,384 B2 | 8/2021 | Finkelstein et al. |
| 11,181,985 B2 | 11/2021 | Holz |
| 11,185,785 B2 | 11/2021 | Shuster |
| 2006/0262921 A1* | 11/2006 | Eppel ............... H04M 3/523 379/265.02 |
| 2011/0055912 A1* | 3/2011 | Fusari ............... G06F 16/972 726/8 |
| 2011/0299675 A1* | 12/2011 | Stucker ............. H04M 3/428 379/207.02 |
| 2014/0280324 A1* | 9/2014 | Teletia ............... G06F 16/951 707/770 |
| 2016/0057139 A1* | 2/2016 | McDonough ...... H04L 63/168 726/6 |
| 2019/0121859 A1 | 4/2019 | Orsini et al. |
| 2019/0146616 A1 | 5/2019 | White et al. |
| 2020/0110524 A1 | 4/2020 | Lemay et al. |
| 2020/0228363 A1 | 7/2020 | Ansari et al. |
| 2020/0282717 A1 | 9/2020 | Thomas-Lepore et al. |
| 2020/0322304 A1 | 10/2020 | Miller |
| 2020/0371968 A1 | 11/2020 | Beel et al. |

\* cited by examiner

SYSTEM AND METHOD FOR CONDUCTING MULTI-SESSION USER INTERACTIONS

TECHNICAL FIELD

The present disclosure relates generally to wireless communication through various channels, and more specifically to a system and method for conducting multi-session user interactions.

BACKGROUND

An organization may provide a service or a product to customers. The customer of the organization may contact the organization about a product or a service. The customer may initiate multiple interactions with the organization about the same topic. Every time the customer initiates a new interaction, the customer has to repeat the purpose of the interaction.

SUMMARY

The system described in the present disclosure is particularly integrated into practical applications of improving network routing efficiency and reducing network congestion. This, in turn, provides an additional practical application of improving network bandwidth allocation efficiency and utilization. As such, the technology disclosed in the present disclosure improves the underlying operations of network nodes, servers, switches, and routers that communicate data among devices. These practical applications are described below.

The present disclosure contemplates systems and methods configured to conduct multi-session user interactions. In a multi-session user interaction, a user may initiate multiple user interactions with various entities (associated with an organization) about the same topic. In an example scenario, assume that the user wants to perform a task that is related to a product or a service provided by the organization. The user may initiate a first interaction session with a first entity (associated with the organization). The first interaction session may be via a first communicating channel. The first communication channel may be a voice-based communication channel (e.g., a phone call), a video-based communication channel (e.g., a video meeting), a message-based communication channel (e.g., email or online chat via a mobile, a web, or a software application), and in-person communication. The first interaction session may be in form of audio, text, a video, or any combination thereof.

The disclosed system may authenticate the user based on verifying a passcode sent to a phone number associated with the user, biometric data associated with the user, internet protocol (IP) address of a computing device from which the user has initiated the first interaction session, and personal information of the user (e.g., phone number, name, etc.). This authentication information may be used for authenticating the user in subsequent interaction sessions.

The disclosed system determines context information associated with the first interaction session. The context information may include a summary associated with the first interaction session. The disclosed system generates a token identifier (ID) that uniquely identifies the user and the determined context information.

The user may want to continue the discussion about the task in a subsequent interaction session. Thus, the user may initiate a second interaction session. The second interaction session may be between the user and a second entity associated with the organization. The second interaction session may be via a second communication channel. The second communication channel may be a voice-based communication channel (e.g., a phone call), a video-based communication channel (e.g., a video meeting), a message-based communication channel (e.g., email or online chat via a mobile, a web, or a software application), and in-person communication. The second interaction session may be in the form of audio, text, a video, or any combination thereof.

The disclosed system may authenticate the user based on the token ID and/or the authentication information described above. Thus, the user may not have to go through the authentication process again because the user is authenticated in the first interaction session.

The disclosed system communicates the first context information associated with the first interaction session to the second entity. Thus, the second entity becomes aware of the context information and the topic of discussion in the previous interaction session. Thus, the user does not have to repeat the purpose, context, status, and stage of the discussion in the second interaction session. The disclosed system may perform a similar operation for subsequent interaction sessions.

The disclosed system may accumulate a plurality of context information determined in multiple interaction sessions and communicate the plurality of context information to a new entity with which the user interacts in a new interaction session. In this manner, the new entity becomes aware of the context of the discussion before the new interaction session begins. Thus, the disclosed system may improve the user experience in multiple interactions about the same topic (e.g., task).

As such, the disclosed system enables data transmission across various communication channels to provide a more seamless multi-session interaction between the user and multiple entities.

Since the user does not have to repeat the purpose or context of the discussion in a new interaction session, the duration of the new interaction session may be reduced. The reduction of the duration of the new interaction session may lead to fewer data packets being transmitted over a network between computer systems from which the user and the new entity communicate with each other. Thus, the network bandwidth is less occupied and network congestion is reduced. Therefore, the unoccupied network bandwidth may be allocated to other data transmissions.

Accordingly, the disclosed system may be integrated into a practical application of improving network bandwidth allocation efficiency and utilization.

Furthermore, fewer network resources and data packets may be needed to conduct the interaction session. Accordingly, the disclosed system may be integrated into a practical application of improving network resource utilization.

As such, the disclosed system improves the underlying operations of network nodes, servers, switches, and routers that communicate data among computer systems from which the user and the entities communicate with each other.

Additionally, the disclosed system may be integrated into an additional practical application of improving the authentication process of users. For example, by authenticating the user in the first interaction session, certain information associated with the user may be stored and used for authentication of the user in subsequent interaction sessions, such as an IP address of the computing device associated with the user, biometric data associated with the user, etc.

In one embodiment, a system for conducting multi-session user interactions comprises a memory and a processor.

The memory is configured to store user interaction information associated with a user. The processor is operably coupled with the memory. The processor accesses a first interaction session between the user and a first entity, where the first interaction session is via a first communication channel. The processor determines first context information associated with the first interaction session, where the first context information associated with the first interaction session comprises a summary associated with the first interaction session. The processor generates a token identifier (ID) uniquely identifying the user and the first context information. The processor associates the token ID to the user interaction information. The processor accesses a second interaction session between the user and a second entity, where the second interaction session is via a second communication channel. The processor authenticates the user based at least in part upon the token ID. The processor communicates the first context information associated with the first interaction session to the second entity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
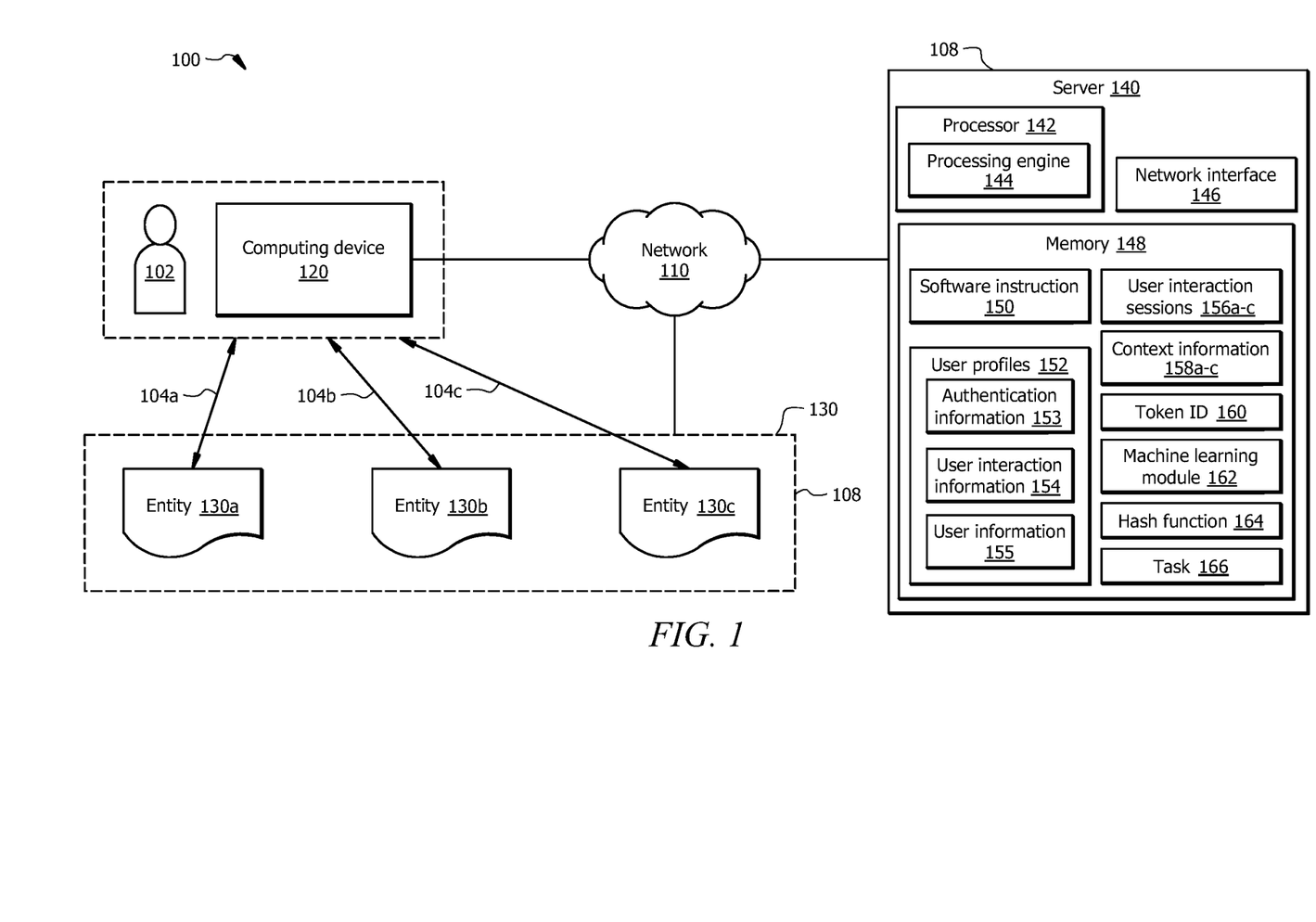
FIG. 1 illustrates an embodiment of a system configured to conduct multi-session user interactions.
Figure 2:
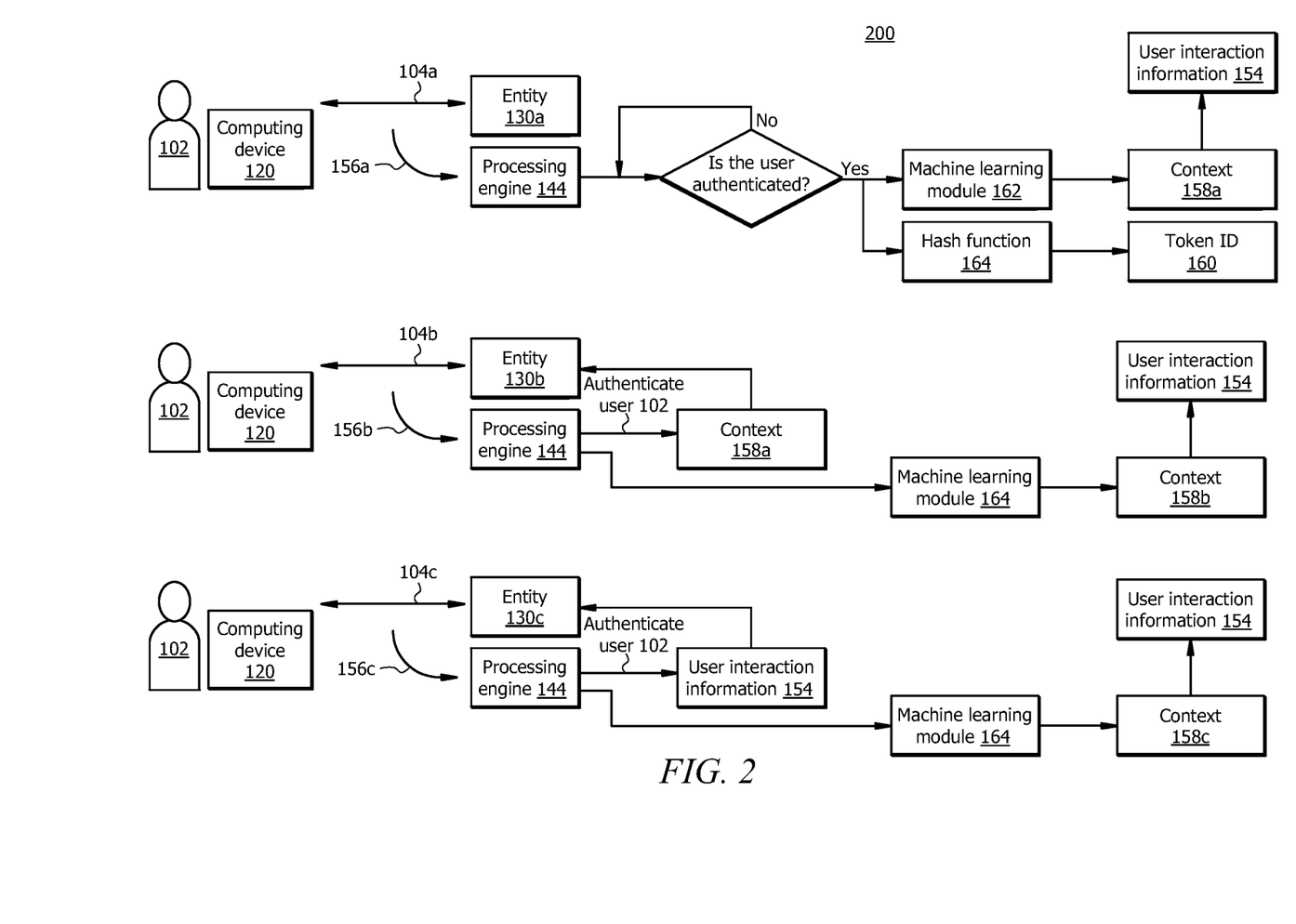
FIG. 2 illustrates an example operational flow of the system of FIG. 1.
Figure 3:
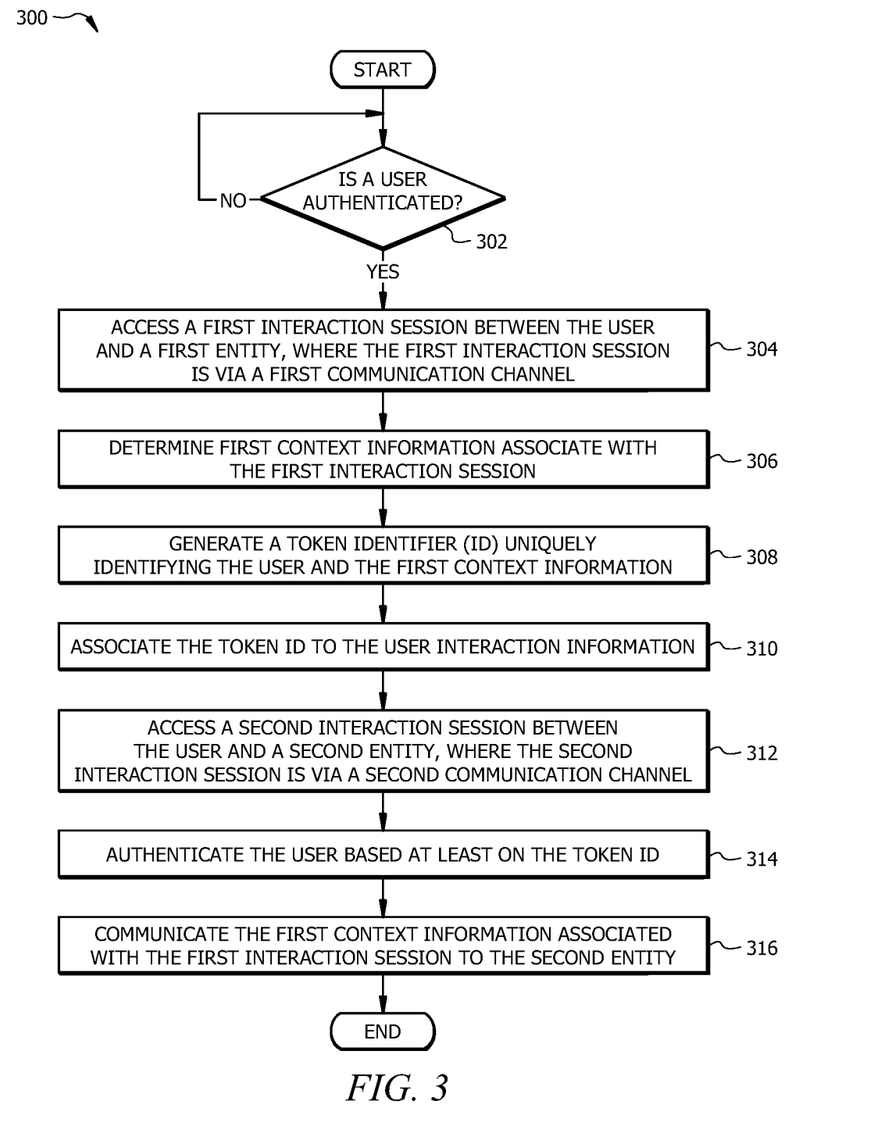
FIG. 3 illustrates an example flowchart of a method for conducting multi-session user interactions.

As described above, previous technologies fail to provide efficient and reliable solutions to conduct multi-session user interactions. This disclosure provides various systems and methods to conduct multi-session user interactions. Embodiments of the present disclosure and its advantages may be understood by referring to FIGS. 1 through 3. FIGS. 1 through 3 are used to describe a system and method for conducting multi-session user interactions.

Example System for Conducting Multi-Session User Interactions

FIG. 1 illustrates one embodiment of a system 100 that is configured to conduct multi-session interactions. In one embodiment, the system 100 comprises a server 140 communicatively coupled with a computing device 120 and one or more entities 130 via a network 110. Network 110 enables the communication between components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes the processing engine 144 to determine context information 158 of a user interaction session 156 associated with a user 102, generate a token identifier (ID) 160 for the user 102, and route the context information 158 of the user interaction session 156 to a subsequent user interaction session 156. In other embodiments, system 100 may not have all of the components listed and/or may have other elements instead of, or in addition to, those listed above.

In general, the system 100 improves data transmission in multi-session user interaction. In an example scenario, assume that the user 102 wants to perform a task 166 that is related to a service and/or a product that the organization 108 provides. To this end, the user 102 may contact organization 108. The user 102 may initiate a first user interaction session 156a with a first entity 130a via a first communication channel 104a. The first entity 130a may be associated with organization 108. For example, the first entity 130a may be a person or a computer-implemented conversational agent. The first communication channel 104a may be a voice-based communication channel, a video-based communication channel, a message-based communication channel (e.g., email or online chat via a mobile, a web, or a software application), or in-person communication.

The system 100 accesses the first user interaction session 156a at the server 140. The server 140 (via the processing engine 144) determines a context information 158a of the first user interaction session 156, e.g., by feeding the first interaction session 156 to a machine learning module 162. The context information 158a of the first user interaction session 156a may include a summary associated with the first user interaction session 156a, e.g., a summarized discussion during the first user interaction session 156a. The processing engine 144 generates a token ID 160 that uniquely identifies the user 102 and the context information 158a of the first user interaction session 156a. The processing engine 144 associates the token ID 160 to the user interaction session 156a. The token ID 160 is used to identify the user 102 in subsequent user interaction sessions 156. In this particular example scenario, assume that the user 102 wants to continue the discussion about the initial task 166 with the organization 108. To this end, the user 102 may initiate a second user interaction session 156b with a second entity 130b via a second communication channel 104b. The second communication channel 104b may include a voice-based communication channel, a video-based communication channel, a message-based communication channel (e.g., email or online chat via a mobile, a web, or a software application), or in-person communication. The second entity 130b may be associated with the organization 108. For example, the second entity 130b may be a person or a computer-implemented conversational agent. The processing engine 144 determines that the user 102 is the same as the user associated with the first user interaction session 156a based on the token ID 160 and/or authentication information 153. The processing engine 144 authenticates the user 102 based on the token ID 160 and/or authentication information 153. In response, the processing engine 144 communicates the context information 158a of the first user interaction session 156a to the second entity 130b. The processing engine 144 may perform a similar operation for subsequent user interaction sessions 156 associated with the user 102, such as a third interaction session 156c via a third communication channel 104c between the user 102 and a third entity 130c.

At each user interaction session 156, the processing engine 144 determines the context information 158 of the user interaction session 156 and adds that to the user interaction information 154 stored in a user profile 152 of the user 102. Thus, the processing engine 144 accumulates a plurality of context information 158 of multiple user interaction sessions 156 of the user 102 about the same topic or task 166. At each user interaction session 156, the processing engine 144 transmits the user interaction information 154 that comprises the accumulated context information 158 of previous user interaction sessions 156 to an entity 130 that the user 102 is currently interacting with. In this manner, the user 102 does not need to repeat the purpose, context, status, or stage of the task 166 every time the user 102 is interacting with a new entity 130 in a new user interaction session 156. Thus, fewer data packets are needed to conduct the interaction session 156. Therefore, the network bandwidth is less occupied and network congestion is reduced. Furthermore, system 100 improves the network bandwidth utilization and efficiency in network routing.

System Components

Network

Network 110 may be any suitable type of wireless and/or wired network, including, but not limited to, all or a portion of an Internet, an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network. The network 110 may be configured to support any suitable type of communication protocol as would be appreciated by one of ordinary skill in the art.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The computing device 120 is configured to communicate with other devices via the network 110. For example, the computing device 120 may communicate with a device (e.g., a personal computer, a desktop computer, a workstation, a server, a laptop, a tablet computer, a mobile phone) associated with an entity 130.

Entity

In one embodiment, entity 130 may include a person. The user 102 may communicate with a person (e.g., staff) associated with the organization 108 in a user interaction session 156. In one example, the user 102 may communicate with the person directly when the user 102 is meeting with the person at a location, a branch of the organization 108. In another example, the person can have access to a computing device (e.g., a personal computer, a desktop computer, a workstation, a server, a laptop, a tablet computer, etc.) to communicate with the user 102 via the network 110.

In certain embodiments, the entity 130 (e.g., a person) may converse with the user 102 via an audio-based communication, a video-based communication, and/or a message-based communication. For example, the entity 130 (e.g., a person) may converse with the user 102 over a voice-based phone call, a video-based call, a texting application platform, such as an electronic mail (e-mail) application or an online chat via a mobile application and/or a web application, or any other communication channels.

In certain embodiments, the user interaction session 156 between the user 102 and the entity 130 may be recorded by a camera and/or a microphone. The camera and/or microphone may be observing the user interaction session 156 between the user 102 and the first entity 130a may record a video and/or audio of the interaction session 156. The camera and/or microphone may be communicatively coupled with the computer device associated with the entity 130. The user interaction session 156 may be in text, audio, and/or video format. Upon recording the user interaction session 156, the user interaction session 156 may be transmitted to the server 140 for processing.

In another embodiment, the entity 130 may include a computer-implemented conversational agent. In this case, the entity 130 may be hosted by or resident in a computer device, e.g., a personal computer, a desktop computer, a workstation, a server, a laptop, a tablet computer, etc. The computer device may comprise a hardware processor, memory, and/or circuitry configured to perform any of the functions or actions of the entity 130 described herein. For example, a software application designed using software code may be stored in the memory and executed by the processor to perform the functions of the entity 130 described herein. In the case where the entity 130 is a computer-implemented conversational agent, the entity 130 may be configured to converse with the user 102.

In certain embodiments, the user interaction session 156 between the user 102 and the entity 130 may in text format. For example, the entity 130 (e.g., the computer-implemented conversational agent) may be configured by a machine learning module, such as text processing and/or natural language processing neural network to extract features from text that is received from the user 102, understand the text, and respond to the user 102 in form of text and/or audio.

In certain embodiments, the user interaction session 156 between the user 102 and the entity 130 may be in audio format. For example, the entity 130 (e.g., the computer-implemented conversational agent) may be configured by a machine learning module, such as audio processing and/or speech processing neural network to extract features from speech of the user 102, understand the speech, and respond to the user 102 in form of text and/or audio.

In certain embodiments, the entity 130 (e.g., the computer-implemented conversational agent) may be configured to converse with the user 102 via an audio-based communication, a video-based communication, and/or a message-based communication. For example, the entity 130 may be configured to converse with the user 102 over a voice-based phone call, a video-based call, a texting application platform, such as an electronic mail (e-mail) application or an online chat via a mobile application and/or a web application, or any other communication channels.

The user interaction session 156 between the user 102 and the entity 130 may be recorded by a camera and/or a microphone and transmitted to the server 140 for processing.

Server

Server 140 is generally a device that is configured to process data and communicate with computing devices (e.g., computing devices 120), entities 130, databases, systems, etc., via the network 110. The server 140 may be associated with the organization 108. The server 140 is generally configured to oversee the operations of the processing engine 144, as described further below in conjunction with the operational flow 200 of system 100 described in FIG. 2 and method 300 described in FIG. 3.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors 142 may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Network interface 146 is configured to enable wired and/or wireless communications. The network interface 146 may be configured to communicate data between the autonomous vehicle 402 and other devices, systems, or domains. For example, the network interface 146 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 146. The network interface 146 may be configured to use any suitable type of communication protocol as would be appreciated by one of ordinary skill in the art.

The memory 148 may be volatile or non-volatile and may comprise read-only memory (ROM), random-access memory (RAM), ternary content-addressable memory (TCAM), dynamic random-access memory (DRAM), and static random-access memory (SRAM). The memory 148 may include one or more of a local database, cloud database, network-attached storage (NAS), etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-3 along with any other data, instructions, logic, rules, or code operable to implement the function(s) described herein when executed by processor 142. For example, the memory 148 may store software instructions 150, user profiles 152, user interaction sessions 156a-c, context information 158a-c, token ID 160, machine learning module 162, hash function 164, task 166, and/or any other data or instructions. The software instructions 150 may comprise any suitable set of instructions, logic, rules, or code operable to execute the processor 142 and perform the functions described herein, such as some or all of those described in FIGS. 1-3.

Processing Engine

Processing engine 144 may be implemented by the processor 142 executing the software instructions 150, and is generally configured to perform one or more operations described herein. For example, the processing engine 144 may be configured to determine context information 158 of a user interaction session 156 between the user 102 and an entity 130. The context information 158 of the interaction session 156 may include a summary associated with the interaction session 156, e.g., a summarized discussion between the user 102 and the entity 130 during the interaction session 156, a topic of the discussion, and/or any contextual data representing the interaction session 156.

In certain embodiments, the processing engine 144 may be implemented by supervised machine learning, semi-supervised machine learning, and/or unsupervised machine learning algorithm. For example, the machine learning module 162 may comprise a support vector machine, neural network, random forest, k-means clustering, etc. In another example, the machine learning module 162 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

In various example scenarios, the interaction session 156 between the user 102 and the entity 130 may be in form of text (e.g., via an online chat, an email, and the like), audio and/or video (e.g., a phone call, a video call, an in-person conversation), etc. The machine learning module 162 may include a video processing, a speech signal processing, and text processing (e.g., natural language processing) to determine the context information 158 of the user interaction session 156 that is in the form of text, video, audio format, or any combination thereof. In this process, the processing engine 144 feeds the interaction session 156 to the machine learning module 162. The machine learning module 162 extracts features from the interaction session 156. The extracted features may be represented by a vector of numerical values. The machine learning module 162 may determine key phrases and keywords from among the discussion of the interaction session 156.

For example, the machine learning module 162 may use part-of-speech tagging, words sequences, word tokenization, sentence tokenization, word segmentation, sentence segmentation, sentiment analysis, and/or any other linguistic pattern analysis to identify the key phrases. The key phrases may be identified based on a length of a key phrase, a frequency of occurrence of a key phrase, a number of characters in a key phrase, a position of a key phrase in a sentence, the meaning of the key phrase, and other criteria.

The machine learning module 162 may use a training dataset that comprises documents labeled with key phrases. The machine learning module 162 may also use a lexicon of previously identified key phrases to compare with the identified key phrases in the interaction session 156. In this manner, the machine learning module 162 may be trained to identify more accurate key phrases of the interaction session 156. The machine learning module 162 may use the identified key phrases to determine the summary of the discussion between the user 102 and the entity 130 during the interaction session 156.

The processing engine 144 may be configured to generate a token ID 160 for the user 102 and the initial interaction session 156. In this process, the processing engine 144 may use a hash function 164. The hash function 164 may be configured to generate a unique hash value based on input. For example, the processing engine 144 may feed user information 155 to the hash function 164 to generate a token ID 160.

The user information 155 may include a name of the user 102, a timestamp of initiating the interaction session 156, the context information 158 of the interaction session 156, the summary of the discussion during the interaction session 156, the topic of the discussion, and/or any other information associated with the user 102 and/or the interaction session 156.

The token ID 160 may correspond to a non-reversible hash value comprising an alphanumerical string. The token ID 160 may be generated from the user information 155 fed to the hash function 164. The token ID 160 may be used to uniquely identify the user 102, the context information 158 of the user interaction session 156, and/or other user information 155.

Example Operational Flow for Conducting a Multi-Session User Interaction

FIG. 2 illustrates an embodiment of an operational flow 200 of system 100 of FIG. 1. In an example scenario, assume that the user 102 wants to perform a task 166 related to a service and/or a product that the organization 108 provides. To this end, the user 102 may initiate a first user interaction session 156*a* with a first entity 130*a* associated with the organization 108. The first entity 130*a* may be an instance of entities 130 described in FIG. 1.

The operational flow 200 begins when the processing engine 144 accesses the first user interaction session 156*a* between the user 102 and the first entity 130*a*. The user first interaction session 156*a* may be via a first communication channel 104*a*. The first communication channel 104*a* may include any of a voice-based communication channel (e.g., a phone call), a video-based communication channel (e.g., a video meeting), a message-based communication channel (e.g., email or online chat via a mobile, a web, or a software application), or in-person communication.

For example, in cases where the first user interaction session 156*a* is via an in-person communication, a camera observing the in-person communication between the user 102 and the first entity 130*a* may record a video of the first interaction session 156*a* and transmit the video recording to the server 140 for processing. The camera may be communicatively coupled with a computer device associated with the first entity 130*a*.

In another example, in cases where the first user interaction session 156*a* is via the voice-based communication, the conversation between the user 102 and the first entity 130*a* may be recorded by a microphone (e.g., associated with a computing device of the first entity 130*a* and communicatively coupled with the server 140) and transmitted to the server 140 for processing.

In another example, in cases where the first user interaction session 156*a* is via the video-based communication, the conversation between the user 102 and the first entity 130*a* may be recorded by a camera and/or a microphone (e.g., associated with a computing device of the first entity 130*a* and communicatively coupled with the server 140) and transmitted to the processing engine 144.

In another example, in cases where the first user interaction session 156*a* is via the message-based communication, the conversation between the user 102 and the first entity 130*a* may be recorded in a log text file (e.g., by a computing device of the first entity 130*a* and communicatively coupled with the server 140) and transmitted to the processing engine 144.

Authenticating the User

The processing engine 144 may determine whether the identity of the user 102 is verified, i.e., whether the user 102 is authenticated. For example, the user 102 may be verified in response to sending a passcode to the computing device 120 (e.g., to a phone number associated with the user 102), receiving the passcode, and verifying the passcode.

In another example, the user 102 may be verified based on biometric data associated with the user 102, such as fingerprint data, facial feature data, retinal data, or voice sample, among other biometric data. In this example, assuming that the user 102 is initiating an in-person interaction session 156*a* (e.g., at a location) with the first entity 130*a* (e.g., a person), a fingerprint scanner communicatively coupled with a computing device of the first entity 130*a* may capture a fingerprint of the user 102. The fingerprint data may be extracted by the computing device of the first entity 130*a* or any other device that is capable of extracting the fingerprint data, e.g., the server 140.

In the same or another example, a camera communicatively coupled with the computing device of the first entity 130*a* may capture a video and/or an image of the user 102. The facial features of the user 102 may be extracted, e.g., by the computing device of the first entity 130*a* or any other device that is capable of extracting the facial features, e.g., the computing device 120 or the server 140. For example, the server 140 may implement an image processing, a video processing, a feature extraction and/or any suitable machine learning algorithm to extract the facial features of the user 102 from the image and/or video of the user 102.

In another example, the user 102 may be verified based on determining that a voice sample of the user 102 (e.g., received during a call) matches a previously provided voice sample of the user 102. In another example, the user 102 may be verified based on an internet protocol (IP) address of the computing device 120 from which the user 102 initiates the first user interaction session 156*a*. In this example, upon determining the IP address of the computing device 120, the processing engine 144 may analyze the IP address. In this process, the processing engine 144 compares the IP address with one or more IP addresses previously associated with the user 102 and stored in the user profile 152. If it is determined that the IP address of the computing device 120 matches an IP address from among the one or more IP addresses previously associated with the user 102 and stored in the user profile 152, the processing engine 144 determines that user 102 is verified.

In another example, the user 102 may be authenticated based on a phone number associated with the user 102, security questions, a name of the user 102, personal information associated with the user 102, and/or any other information previously provided by the user 102 and stored in the user profile 152.

In certain embodiments, any number and combination of authentication methods described above may be used to authenticate the user 102. The operational flow 200 may remain at this stage until the user 102 is authenticated.

In response to authenticating of the user 102, authentication information 153 used in authenticating the user 102, including the IP address of the computing device 120, biometric data of the user 102, the name of the user 102, etc., may be stored in the user profile 152 and used for future authentication of the user 102 in subsequent interaction sessions 156.

Determining Context Information of the First Interaction Session

The processing engine 144 determines the context information 158a of the first interaction session 156a. The context information 158a of the first interaction session 156a may include a summary associated with the first interaction session 156a, such as a summarized discussion between the user 102 and the first entity 130a during the first interaction session 156a, a topic of the discussion, and/or any contextual data representing the first interaction session 156a.

The processing engine 144 determines the context information 158a of the first interaction session 156a by feeding the first interaction sessions 156a to the machine learning module 162 and determining key phrases of the discussion during the first interaction sessions 156a, similar to that described in in FIG. 1.

The processing engine 144 generates the token ID 160 that uniquely identifies the user 102 and the context information 158a of the first interaction session 156a. In this process, the processing engine 144 feeds user information 155 to the hash function 164, similar to that described in FIG. 1.

The processing engine 144 associates the token ID 160 to the first user interaction session 156a and/or the user interaction information 154. The processing engine 144 adds the context information 158a to the user interaction information 154.

Routing the Context Information of the First Interaction Session to a Second Entity In the example scenario of FIG. 2, assume that the user 102 wants to initiate another interaction session 156 to continue the discussion of the first interaction session 156a related to the task 166. Thus, the user 102 initiates a second interaction session 156a. The second interaction session 156a may be between the user 102 and a second entity 130b associated with the organization 108. The second entity 130b may be an instance of the entities 130 described in FIG. 1.

The second interaction session 156a may be via a second communication channel 104b. The second communication channel 104b may include any of a voice-based communication channel (e.g., a phone call), a video-based communication channel (e.g., a video meeting), a message-based communication channel (e.g., email or online chat via a mobile, a web, or a software application), or in-person communication.

The processing engine 144 accesses the second interaction session 156b. The processing engine 144 may access the second interaction session 156b similar to that described above with respect to accessing the first interaction session 156a.

Upon accessing the second interaction session 156b, the processing engine 144 may verify or authenticate the user 102 based on any of the token ID 160, user information 155, and/or the authentication information 153 stored in the user profile 152. In this manner, the user 102 does not have to go through the authentication process again because the user 102 was previously authenticated in the first interaction session 156a.

Upon authenticating the user 102, the processing engine 144 communicates the context information 158a of the first user interaction session 156a to the second entity 130b. For example, if the second entity 130b is a person, the processing engine 144 may route the context information 158a to a computing device associated with the person via the network 110. In another example, if the second entity 130b is a computer-implemented conversational agent, the processing engine 144 may route the context information 158a to a computing device that hosts the conversational agent via the network 110.

In this manner, the second entity 130b may obtain the context information 158a of the previous interaction session 156a. Thus, the user 102 does not have to repeat the purpose, context, status, and stage of the discussion and the task 166 in the second interaction session 156b.

Determining Context Information of the Second User Interaction Session

The processing engine 144 determines the context information 158b of the second user interaction session 156b. The context information 158b may include a summary associated with the second interaction session 156b, such as a summarized discussion between the user 102 and the second entity 130b during the second interaction session 156b, a topic of the discussion, and/or any contextual data representing the second interaction session 156b.

The processing engine 144 determines the context information 158b of the second user interaction session 156b by feeding the second interaction session 156b to the machine learning module 162 and determining key phrases of the discussion during the second interaction session 156b, similar to that described above in FIG. 1. The processing engine 144 adds the context information 158b to the user interaction information 154.

Communicating the User Interaction Information to a Third Entity

In the example scenario of FIG. 2, assume that the user 102 wants to initiate another interaction session 156 to continue the discussion of the first and second interaction sessions 156a and 156b related to the task 166. Thus, the user 102 may initiate a third interaction session 156c. The third interaction session 156c may be between the user 102 and a third entity 130c associated with the organization 108. The third entity 130c may be an instance of entities 130 described in FIG. 1.

The third interaction session 156c may be via a third communication channel 104c. The third communication channel 104c may include any of a voice-based communication channel (e.g., a phone call), a video-based communication channel (e.g., a video meeting), a message-based communication channel (e.g., email or online chat via a mobile, a web, or a software application), and in-person communication.

The processing engine 144 accesses the third interaction session 156c, similar to that described above with respect to receiving the first interaction session 156a. Upon accessing the third interaction session 156c, the processing engine 144 may verify or authenticate the user 102 based on any of the token ID 160, user information 155, and/or the authentication information 153. Thus, the user 102 does not have to go through the authentication process again because the user 102 was previously authenticated in the first interaction session 156a.

Upon authenticating the user 102, the processing engine 144 communicates the user interaction information 154 to the third entity 130c. For example, if the third entity 130c is a person, the processing engine 144 may communicate the user interaction information 154 to a computing device associated with the person via the network 110. In another example, if the third entity 130c is a computer-implemented conversational agent, the processing engine 144 may communicate the user interaction information 154 to a computing device that hosts the conversational agent via the network 110.

In this manner, the third entity 130c may obtain the user interaction information 154 related to the previous interaction sessions 156a and 156b. Thus, the user 102 does not have to repeat the purpose, context, status, and stage of the discussion and the task 166 in the third interaction session 156c. The processing engine 144 adds the context information 158c to the user interaction information 154.

The processing engine 144 may perform a similar operation for subsequent interaction sessions 156. Thus, in a new interaction session 156 with a new entity 130, the new entity 130 receives the user interaction information 154 that comprises the accumulation of a plurality of context information 158 of the previous interaction sessions 156. In this manner, the user 102 does not need to repeat the purpose, context, status, and stage of the task 166 every time the user 1002 is interacting with a new entity 130 in a new user interaction session 156.

Closing the Token ID

In one embodiment, the processing engine 144 may close (e.g., expire) the token ID 160 if it is determined that the token ID 160 has reached a pre-configured expiration date. The expiration date may be one day, two days, one week, two weeks, or any suitable time period. The expiration date may be set depending on the complexity of the task 166 for which the user 102 is initiating user interactions 156. For example, if the task 166 is complex, the expiration date may be longer than in a case when the task 166 is not complex. By closing the token ID 160, the process of adding context information 158 of a user interaction session 156 to the user interaction information 154 may be stopped.

In another embodiment, the processing engine 144 may close the token ID 160 in response to receiving a message that indicates the task 166 is completed (or a request to complete the task 166 is fulfilled). For example, in any of the user interaction sessions 156, if the user 102 indicates that the task 166 is completed, the processing engine 144 may close the token ID 160.

The processing engine 144 may reopen the token ID 160 in response to a request from the user 102 in a user interaction session 156.

Although FIG. 2 is described with three interaction sessions 156a-c, system 100 of FIG. 1 is configured to conduct any number of interaction sessions 156 with any number of entities 130.

Example Method for Routing Calls Between Two or More Users

FIG. 3 illustrates an example flowchart of a method 300 for conducting multi-session user interactions. Modifications, additions, or omissions may be made to method 300. Method 300 may include more, fewer, or other steps. For example, steps may be performed in parallel or in any suitable order. While at times discussed as the system 100, server 140, or components of any of thereof performing operations, any suitable system or components of the system may perform one or more operations of the method 300. For example, one or more operations of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 302-316.

Method 300 begins at 302 where the processing engine 144 determines whether the user 102 is authenticated. For example, the processing engine 144 may determine whether the user 102 is authenticated based on verifying a passcode sent to a phone number associated with the user 102, biometric data associated the user 102, IP address of the computing device 120 associated with the user 102, personal information of the user 102 (e.g., phone number, name, etc.) and/or any other information associated with the user 102, such as the user information 155, similar to that described in FIG. 2. If it is determined that the user 102 is authenticated, method 300 proceeds to 304. Otherwise, method 300 remains at 302 until the user 102 is authenticated.

At 304, the processing engine 144 accesses a first interaction session 156a between the user 102 and a first entity 130a, where the first interaction session 156a is via a first communication channel 104a. The processing engine 144 may access the first interaction session 156a in response to receiving the first interaction session 156a from the computing device 120 and/or a computer device associated with the first entity 130a, similar to that described in FIG. 2.

At 306, the processing engine 144 determines first context information 158a associated with the first interaction session 156a. In this process, the processing engine 144 feeds the first interaction session 156a to the machine learning module 162 and determines a summary associated with the first interaction session 156a, similar to that described in FIG. 2. The first context information 158a may include a summary associated with first interaction session 156a.

At 308, the processing engine 144 generates a token ID 160 uniquely identifying the user 102 and the first context information 158a. In this process, the processing engine 144 may feed user information 155 to the hash function 164, similar to that described in FIG. 2.

At 310, the processing engine 144 associated the token ID 160 to the user interaction information 154.

At 312, the processing engine 144 accesses a second interaction session 156b between the user 102 and a second entity 130b, where the second interaction session 156b is via a second communication channel 104b. The processing engine 144 may access the second interaction session 156b in response to receiving the second interaction session 156b from the computing device 120 and/or a computer device associated with the second entity 130b, similar to that described in FIG. 2.

At 314, the processing engine 144 authenticates the user 102 based at least on the token ID 160. In this process, the processing engine 144 may authenticate the user 102 based on any of the token ID 160, the user information 155, and/or the authentication information 153, similar to that described in FIG. 2.

At 316, the processing engine 144 communicates the first context information 158a associated with the first interaction session 156a to the second entity 130b, similar to that described in FIG. 2.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for conducting multi-session user interactions, comprising:
    a memory configured to store user interaction information associated with a user;
    a processor, operably coupled with the memory, and configured to:
        access a first interaction session between the user and a first entity, wherein the first interaction session is via a first communication channel;
        determine first context information associated with the first interaction session, wherein the first context information associated with the first interaction session comprises a summary associated with the first interaction session;
        generate a token identifier (ID) uniquely identifying the user and the first context information, wherein the token ID is generated based at least in part upon the determined summary associated with the first interaction session;
        associate the token ID to the user interaction information;
        access a second interaction session between the user and a second entity, wherein:
            the second interaction session is via a second communication channel;
            the second communication channel is different from the first communication channel;
            the second interaction session is different from the first interaction session; and
            the second entity is different from the first entity;
        authenticate the user based at least in part upon the token ID; and
        communicate the first context information associated with the first interaction session to the second entity.

2. The system of claim 1, wherein the processor is further configured to, in response to determining the first context information associated with the first interaction session, add the first context information to the user interaction information.

3. The system of claim 1, wherein the processor is further configured to:
    determine second context information associated with the second interaction session, wherein the second context information associated with the second interaction session comprises a summary associated with the second interaction session;
    add the second context information associated with the second interaction session to the user interaction information;
    access a third interaction session between the user and a third entity, wherein the third interaction session is via a third communication channel;
    authenticate the user based at least in part upon the token ID; and
    communicate the user interaction information to the third entity.

4. The system of claim 1, wherein each of the first communication channel and the second communication channel comprises:
    a voice-based communication channel;
    a video-based communication channel;
    a message-based communication channel via a mobile application or a web application; or
    an in-person communication.

5. The system of claim 1, wherein determining the first context information associated with the first interaction session comprises feeding the first interaction session to a language processing neural network configured to generate the summary associated with the first interaction session, wherein the first interaction session comprises a text or an audio speech.

6. The system of claim 1, wherein the processor is further configured to close the token ID in response to determining that an expiration date of the token ID is reached.

7. The system of claim 1, wherein the processor is further configured to close the token ID in response to receiving a message that indicates a task indicated during the first interaction session is completed.

8. A method for conducting multi-session user interactions, comprising:
    accessing a first interaction session between a user and a first entity, wherein the first interaction session is via a first communication channel;
    determining first context information associated with the first interaction session, wherein the first context information associated with the first interaction session comprises a summary associated with the first interaction session;
    generating a token identifier (ID) uniquely identifying the user and the first context information, wherein the token ID is generated based at least in part upon the determined summary associated with the first interaction session;
    associating the token ID to user interaction information;
    accessing a second interaction session between the user and a second entity, wherein:
        the second interaction session is via a second communication channel;
        the second communication channel is different from the first communication channel;
        the second interaction session is different from the first interaction session; and
        the second entity is different from the first entity;
    authenticating the user based at least in part upon the token ID; and
    communicating the first context information associated with the first interaction session to the second entity.

9. The method of claim 8, further comprising, in response to determining the first context information associated with the first interaction session, adding the first context information to the user interaction information.

10. The method of claim 8, further comprising:
determining second context information associated with the second interaction session, wherein the second context information associated with the second interaction session comprises a summary associated with the second interaction session;
adding the second context information associated with the second interaction session to the user interaction information;
accessing a third interaction session between the user and a third entity, wherein the third interaction session is via a third communication channel;
authenticating the user based at least in part upon the token ID; and
communicating the user interaction information to the third entity.

11. The method of claim 8, wherein each of the first communication channel and the second communication channel comprises:
a voice-based communication channel;
a video-based communication channel;
a message-based communication channel via a mobile application or a web application; or
an in-person communication.

12. The method of claim 8, wherein determining the first context information associated with the first interaction session comprises feeding the first interaction session to a language processing neural network configured to generate the summary associated with the first interaction session, wherein the first interaction session comprises text or an audio speech.

13. The method of claim 8, wherein the token ID corresponds to a hash value generated from user information comprising a user's name and the summary associated with the first interaction session.

14. The method of claim 8, wherein prior to receiving the first interaction session, the method further comprises authenticating the user based at least in part upon at least one of biometric data of the user and an internet protocol (IP) address of a computing device from which the user initiates the first interaction session.

15. A non-transitory computer-readable medium storing instructions that when executed by a processor cause the processor to:
access a first interaction session between a user and a first entity, wherein the first interaction session is via a first communication channel;
determine first context information associated with the first interaction session, wherein the first context information associated with the first interaction session comprises a summary associated with the first interaction session;
generate a token identifier (ID) uniquely identifying the user and the first context information, wherein the token ID is generated based at least in part upon the determined summary associated with the first interaction session;
associate the token ID to user interaction information;
access a second interaction session between the user and a second entity, wherein:
the second interaction session is via a second communication channel;
the second communication channel is different from the first communication channel;
the second interaction session is different from the first interaction session; and
the second entity is different from the first entity;
authenticate the user based at least in part upon the token ID; and
communicate the first context information associated with the first interaction session to the second entity.

16. The non-transitory computer-readable medium of claim 15, wherein the instructions when executed by the processor, further cause the processor to, in response to determining the first context information associated with the first interaction session, add the first context information to the user interaction information.

17. The non-transitory computer-readable medium of claim 15, wherein the instructions when executed by the processor, further cause the processor to:
determine second context information associated with the second interaction session, wherein the second context information associated with the second interaction session comprises a summary associated with the second interaction session;
add the second context information associated with the second interaction session to the user interaction information;
access a third interaction session between the user and a third entity, wherein the third interaction session is via a third communication channel;
authenticate the user based at least in part upon the token ID; and
communicate the user interaction information to the third entity.

18. The non-transitory computer-readable medium of claim 15, wherein each of the first communication channel and the second communication channel comprises:
a voice-based communication channel;
a video-based communication channel;
a message-based communication channel via a mobile application or a web application; or
an in-person communication.

19. The non-transitory computer-readable medium of claim 15, wherein determining the first context information associated with the first interaction session comprises feeding the first interaction session to a language processing neural network configured to generate the summary associated with the first interaction session, wherein the first interaction session comprises text or an audio speech.

20. The non-transitory computer-readable medium of claim 15, wherein the instructions when executed by the processor, further cause the processor to close the token ID in response to determining that an expiration date of the token ID is reached.

* * * * *